Oct. 10, 1961  R. H. REID  3,003,275
FISHING ROD

Filed Feb. 20, 1959  3 Sheets-Sheet 1

INVENTOR.
ROBERT H. REID
BY Lyon & Lyon
ATTORNEYS

Oct. 10, 1961

R. H. REID 3,003,275

FISHING ROD

Filed Feb. 20, 1959

INVENTOR.
ROBERT H. REID
BY Lyon & Lyon
ATTORNEYS

United States Patent Office 3,003,275
Patented Oct. 10, 1961

3,003,275
FISHING ROD
Robert H. Reid, Costa Mesa, Calif., assignor, by mesne assignments, to Ekco Products Company, Chicago, Ill., a corporation of Delaware
Filed Feb. 20, 1959, Ser. No. 794,604
9 Claims. (Cl. 43—18)

This invention relates to fishing rods, and this application is a continuation-in-part of my copending application, Serial No. 706,976, filed January 3, 1958, entitled Tubular Pole and Method of Fabricating Same.

Included in the objects of this invention are:

First, to provide a fishing rod in which the nuances of movement of a hooked fish as it is being played is transmitted to the fishing rod and by the fishing rod to the fisherman; this being accomplished whether the fishing rod is designed for large or small fish, thus producing a fishing rod which increases the pleasure of fishing.

Second, to provide a fishing rod which is so constructed that the stiffness factor progressively increases from the tip toward the butt within the active region of the rod in such a manner that the zone of maximum curvature moves progressively from the tip toward the butt as the fishing line load is increased; thereby providing a fishing rod capable of handling fish lures varying widely in weight; for example, from 1/16 to 1 ounce on the same rod using the same type of casting motion, without damage to the fishing rod.

Third, to provide a fishing rod which although capable of handling fish varying widely in weight does not sacrifice sensitivity; that is, a fishing rod capable of handling relatively large fish is sensitive to the play of a small fish on the line, for example, a fishing rod designed for deep sea fishing which is also sensitive to the action of live bait on the line.

Fourth, to provide a fishing rod which, by reason of its sensitivity to variations in line tension, gives the fisherman increased awareness of the activity of the fish so that he may use effectively a lighter rod and lighter tackle than has heretofore been possible.

Fifth, to provide a fishing rod which has an excellent casting action permitting longer casting than is possible with conventional fishing rods.

Sixth, to provide a fishing rod in which the hysteresis loss in energy transfer when changing line stress in playing a fish or casting a line is less than in conventional rods, because the zone of maximum stress is less than in a conventional rod and because the progressive loading made possible by the unique profile of the fishing rod permits use of a thinner wall than a conventional fishing rod; thereby providing a fishing rod having a quicker response to load change and less energy absorption so that there is a higher transmission to the angler's hand of energy delivered from the line to the rod tip.

With the above and other objects in view, as may appear hereinafter, reference is directed to the accompanying drawings in which.

Figure 1:
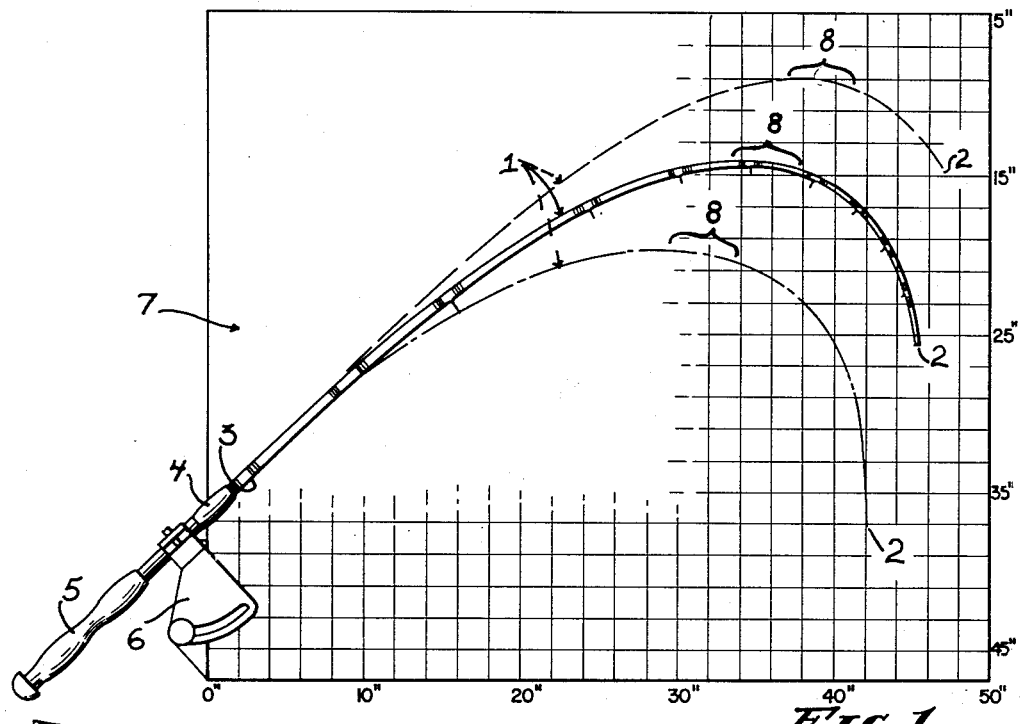
FIGURE 1 is a side view of a fishing rod construction in accordance with this invention, showing the rod by solid lines in a partially flexed position and indicating by broken lines other flexed positions thereof, the rod being disposed in front of a graph to illustrate the nature of the deflections which occur in the rod under load.

Reference is first directed to FIGURE 1 in which is illustrated a fishing rod 1 constructed in accordance with the present invention. The rod includes a relatively small tip end 2 and increases in diameter and wall thickness from this end toward the butt end 3 in a particular manner, as will be brought out hereinafter.

At the butt end 3 the rod 1 may be provided with various handles or grips suitable for the various types of fishing. The rod illustrated, which is a trolling rod, is provided with a fore grip 4 and stock 5 between which is provided means for attachment of a reel (not shown). For the purpose of demonstrating the action of the rod, an angularly adjustable bracket 6 is fastened to the rod adjacent the fore grip. The bracket is mounted in front of a graph plate 7, parallel to and behind the rod.

As will be brought out hereinafter, the particular variation in diameter and wall thickness of a fishing rod construction in accordance with this invention causes the zone of maximum curvature, designated 8, to progress from the tip end 2 toward the butt end 3 as increased force is applied to the tip of the fishing rod 1 in a direction laterally of the normal axis of the rod, such as occurs when tension is applied to a line extending from the end of the rod. Thus, as illustrated in FIGURE 1, as the load is increased, represented by the increased deflection of the rod, the zone of maximum curvature 8, and hence the zone of maximum stress, progresses from the tip end towards the butt end of the rod.

Figure 2:
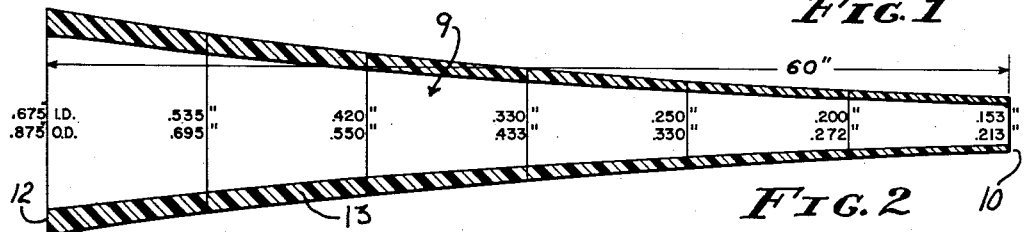
FIGURE 2 is an longitudinal sectional view of a fishing rod constructed in accordance with this invention with the longitudinal scale being greatly reduced and the lateral scale increased, the relation of the lateral or transverse scale being approximately sixteen times that of the longitudinal scale in other to render apparent the significant contour of the fishing rod.

Reference is now directed to FIGURE 2 which illustrates a typical trolling rod 9 constructed in accordance with the present invention. In order to make clear the nature of the rod profile and the variation in wall thickness, the rod is drawn in FIGURE 2 so that the diameter scale is approximately sixteen times the length scale.

It will be observed that the profile of the rod is negatively curved from the tip end 10 toward a point designated 11 near the butt end 12. It will also be observed that the wall 13 increases in thickness from the tip end 10 toward the butt end 12; that is, the rod not only increases in diameter from the tip end but also increases in diameter at an increasing rate between the tip and the point 11. The wall thickness may increase uniformly from the tip end toward the point 11.

For convenience in understanding the construction of the fishing rod, typical internal and external diameters are given at each 10" length of 60" rod, these points being represented by the transverse lines drawn on the figure.

Figure 3:
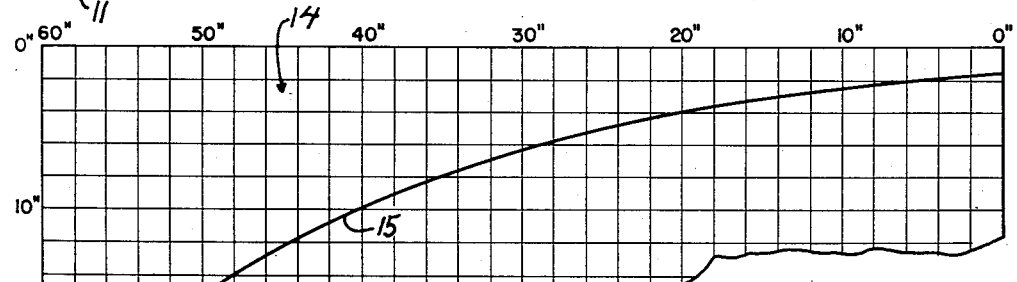
FIGURE 3 is a graph on which is drawn the pattern or flag of glass fiber cloth from which the fishing rod is made.

Reference is now directed to FIGURE 3. In order to construct the fishing rod, a mandrel is formed which has a profile closely conforming to the ideal internal profile of the fishing rod. A flag 14 represented by the area above the curved line 15 on the graph 16, shown in FIGURE 2, is wrapped about the mandrel to form the fishing rod.

The flag or blank 14 is formed of Fiberglas cloth and is impregnated with a suitable resin or plastic so that the successive layers may be bonded together as they are wrapped about the mandrel. The nature of the curved line 15, which represents one margin of the flag, is such that when wrapped about the mandrel corresponding to the internal profile of the fishing rod the wall thickness formed by the increasing convolutions of the flag or blank will produce a substantially, uniformly increasing wall thickness.

It follows that, from the nature of the profile and wall thickness of the fishing rod as shown in FIGURE 2, the strength and stiffness of the rod increases progressively, that is, at an increasing rate towards the butt end. At some point in the length of the rod, the location of which may vary, depending on the type of fishing rod, the nature of the profile may be altered; that is, at the point mentioned the diameter and wall thickness may be more than adequate for any loads that may be imposed on the rod so that the need for a progressively increased diameter does not exist between this point and the butt end of the rod. This is point 11 referred to in FIGURE 2. As will be noted, this point occurs quite close to the butt end of the type of rod shown in FIGURE 2.

Figure 4:
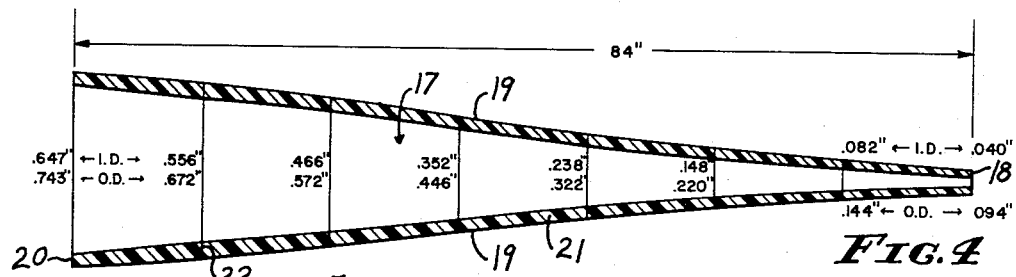
FIGURE 4 is a longitudinal sectional view of another fishing rod construction in accordance with this invention; in this case the transverse scale being approximately twenty-four times the length scale in order to emphasize the unique contour of the fishing rod.

However, for example, in the construction of a salt water casting rod 17, as illustrated in FIGURE 4, the point of departure from a progressively increasing profile may occur midway in the rod. In this regard, reference is directed to FIGURE 4 in which an 84" salt water trolling rod is illustrated in cross section, the transverse scale being approximately twenty-four times the length scale. For purposes of illustration, the internal diameter and external diameter of this rod at 12" intervals, beginning at the tip end, is indicated. In this rod construction, the profile progressively increases in diameter from the tip end 18 to a point 19, and then may increase uniformly or axially at a decreasing rate from the point 19 to the butt end 20 of the rod. In the particular rod construction shown in FIGURE 4, the wall 21 increases uniformly in thickness from the tip end 18 to a point 22 and then diminishes in thickness toward the butt end 20.

Figure 5:
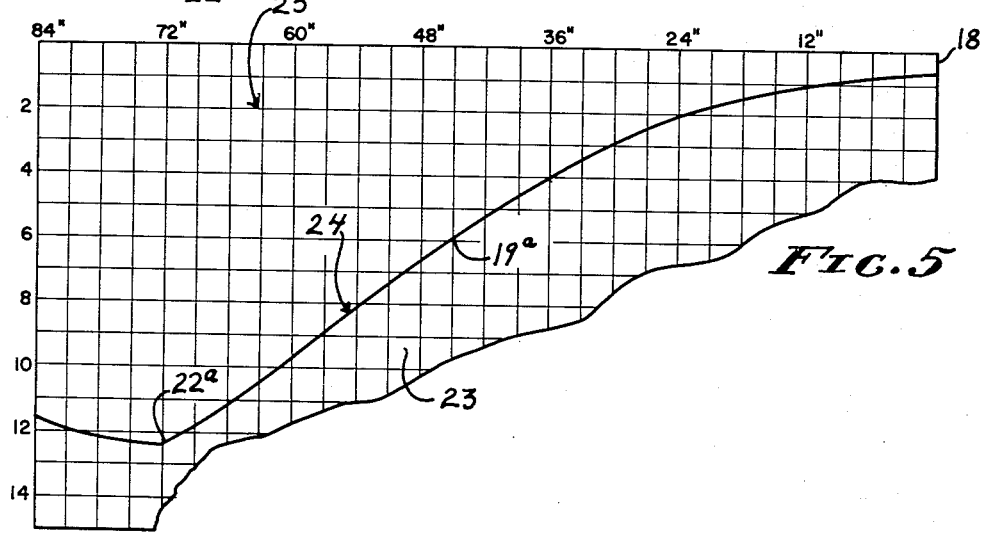
FIGURE 5 is a graph similar to FIGURE 4 showing thereon the flap or pattern of glass fiber cloth employed in the forming of the rod shown in FIGURE 4.

With reference to FIGURE 5, the portion of the graph 23 above the line 24 represents a cloth flag or blank 25 so proportioned that when wrapped about a mandrel having the internal profile of the rod shown in FIGURE 4, it will produce a tube having an increase in wall thickness from the tip end to the point 22 and a decreasing wall thickness beyond this point.

It will be noted that the line 24 has a concave curve or progressively increasing curve to the point 19a corresponding to point 19 in FIGURE 4; then continues as an essentially straight line curve or convex curve to the point 22a corresponding to point 22 on the fishing rod. Beyond this point the flag or blank decreases in width to the butt end. In this type of construction, the action of the fishing rod is principally in the region between the tip end and the point 19.

Figure 6:
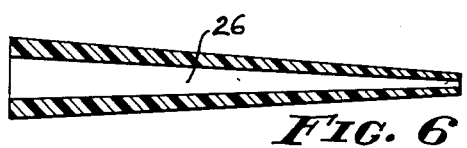
FIGURE 6 is a diagrammatical, longitudinal, sectional view of one form of a standard rod with the length scale greatly reduced for comparison with FIGURES 2 and 3.
Figure 8:
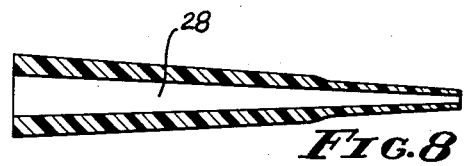
FIGURE 8 is a longitudinal sectional view of another form of conventional rod proportioned for comparison to FIGURES 2 and 4.
Figure 7:
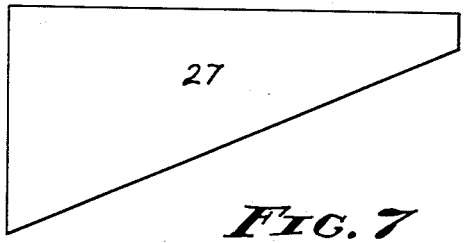
FIGURE 7 is a developed view of the flag or pattern used to form the rod shown in FIGURE 6.
Figure 9:
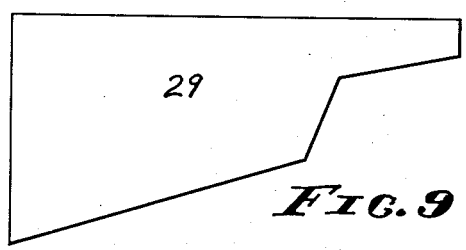
FIGURE 9 is a developed view of the flag or pattern employed in the forming of a rod, such as shown in FIGURE 8.

In both of the illustrated rods 9 and 17 the active portion of the rod has a concave profile and the corresponding flag has a concave side. This is in contrast to a conventionally tapered rod, designated 26, and its corresponding flag 27 shown in FIGURES 6 and 7, and is also in contrast to the stepped type of rod 28 shown in FIGURE 8 and its corresponding flag 29 shown in FIGURE 9.

Figure 10:
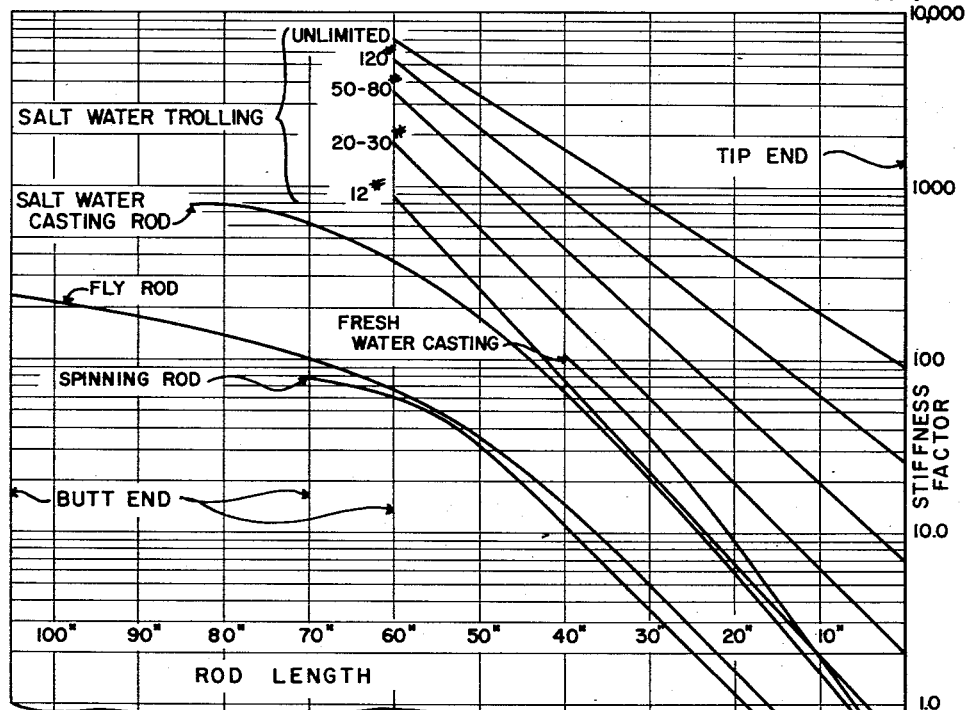
FIGURE 10 is a lineal-log graph showing the relationship of the stiffness factor to rod length of various types of fishing rods constructed in accordance with the present invention.
Figure 11:
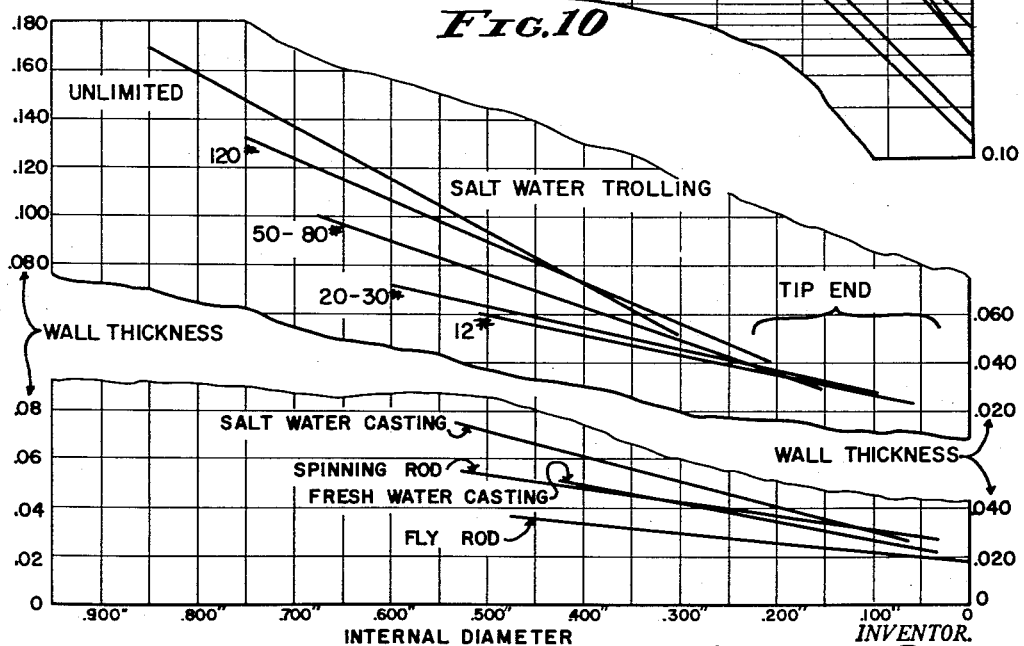
FIGURE 11 is a composite graph showing the relationship of wall thickness to internal diameter for various types of fishing rods constructed in accordance with this invention.

Reference is now directed to FIGURES 10 and 11. It has been found in the construction of rods in accordance with the present invention that an optimum stiffness factor equal to $I \times 10^{-5}$ is satisfactory. In this case:

$$I = \frac{\pi(d_o^4 - d_i^4)}{64}$$

where:

$d_o$ = outside diameter,
$d_i$ = inside diameter.

Desired inside and outside diameters are selected for the tip end and the butt end of the rod, or whatever point short of the butt end that a departure from the negative profile of the rod may commence. The stiffness factors for these two points are then determined and plotted on log-lineal graph paper wherein the log scale represents the strength factor and the lineal scale represents the rod length measured from the tip end.

For example, in plotting the strength factor for 60" trolling rods, the strength factor for the tip end and the butt end is plotted at the tip or zero end and the 60" point on the lineal scale and the points on the log scale corresponding to the stiffness factors of these two points. A straight line curve is drawn between these two points, as shown in FIGURE 10. Still referring to the salt water trolling type of rod, the wall thickness at the tip end and butt end is plotted on lineal-lineal graph paper and straight lines drawn between these points, as shown in FIGURE 11.

Arbitrary intermediate points are selected on the graph FIGURE 11 between the tip internal diameter and butt internal diameter to determine the outside diameter. Then, having determined the inside and outside diameters, the stiffness factor $I \times 10^{-5}$ is calculated and the resulting values located on the corresponding straight line curve of the graph FIGURE 10, to establish the distance in inches from the tip for each of these arbitrarily selected points. The data thus accumulated may be plotted for convenience on a suitable chart. These values are then used to determine the profile to which the mandrel, defining the internal diameter of the rod, is turned. Knowing the thickness of the Fiberglas cloth and knowing the wall thickness at each of these points, the width of the flag or blank at these points may be plotted and connected to form line 15 or 24, or the corresponding edge of the flag or blank.

While straight line curves plotted on log-lineal graph are satisfactory, it should be observed that a limited departure from such straight line curve is permissible; for example, the stiffness factor plots of the salt water casting rod, fresh water rod, fly rod, and spinning rod shown in FIGURE 10. Even in these cases, however, the curve follows close to a straight line function for a substantial distance from the tip. Also, while the increase in wall thickness may be a straight line function on a lineal-lineal graph, some departure from a straight line is permissible, particularly at the butt region of the rod, as indicated in FIGURES 4 and 5.

Thus the side walls of the active section of the rod are concave as shown by exaggerated views in FIGURES 2 and 5, rather than straight and convex. By reason of the unique concave rod profile, the change in stiffness factor from the tip towards the butt end as in FIGURES 2 and 3 or optimum intermediate point as in FIGURES 4 and 5 results in a rod action which is ideal. That is, for a given strength of rod the tip end may have more flexibility than has heretofore been possible, with the result that transmission of forces exerted by the fish from the line to the hands of the fisherman holding the rod is such that the fisherman is acutely aware of the changes in force. This is accomplished without a corresponding sacrifice in rod strength, it being possible to sense the movements of an extremely small fish and yet permit the fisherman to handle effectively with the same rod a much larger fish.

More particularly, and with reference to FIGURE 1, the zone of maximum stress or curvature 8 is less than the comparable zone of a conventional rod. The mass of the rod within zone 8 may be one-fifth of the comparable zone of a conventional rod. Because this mass is smaller the hysteresis loss in energy transfer when changing line stress in playing a fish or casting a line is materially less than in a conventional rod.

By reason of the distinctly defined but progressively shifting stress zone with increasing load, the stress at the tip end approaches zero and in effect becomes a straight extension of the fish line. This essentially straight portion does not dampen the line and thus contributes to, rather than subtracting from, energy transmission through the rod.

Furthermore, the progressive loading permits the use of a thinner wall construction for a given diameter without exceeding a safe working stress than is possible with a conventional rod.

Thus, the shorter maximum stress zone and thinner wall both have the effect of reducing the mass under stress, and hence both contribute to a lower hysteresis loss. To the angler this means two things: First, the rod has quicker response to load change. Second, the lower energy absorption results in more efficient transmission to the angler's hand of energy delivered to the fish line at the rod tip.

While particular embodiments of this invention have been shown and described, it is not intended to limit the same to the exact details of the constructions set forth, and it embraces such changes, modifications, and equivalents of the parts and their formation and arrangement as come within the purview of the appended claims.

What is claimed is:

1. As an article of manufacture, a fishing rod having a tip end, said rod being so formed as to increase in diameter from its tip end at an increasing rate for a substantial portion of its length whereby said rod presents a concave profile.

2. As an article of manufacture, a fishing rod increasing in diameter from its tip end at an increasing rate for a substantial portion of its length whereby said rod presents a concave profile; said rod being tubular and the wall thickness thereof increasing in thickness from its tip end.

3. As an article of manufacture, a fishing rod formed of Fiberglas fabric impregnated with plastic material and wrapped about itself to form a tube having inner and outer walls diverging from the tip end of the fishing rod, at least one of said walls having a concave profile and increasing in diameter at an increasing rate.

4. A method of manufacturing fishing rods, characterized by: forming a mandrel increasing in diameter from its tip end for a substantial portion of its length at an increasing rate; wrapping about said mandrel a plastic impregnated Fiberglas cloth having a profile in which at least one edge is concave, the width of said cloth in proportion to the diameter of said mandrel being such that on being wrapped thereon to form a tube the wall of which increases in thickness as said mandrel increases in diameter.

5. A fabric fishing rod blank destined to be wrapped about a mandrel which increases in diameter from its smaller end at an increasing rate and thereby having a concave profile, wherein: said fabric blank is provided with at least one concave edge and increases in width from its narrower end at such a rate that when wrapped about said mandrel said blank will become a tube increasing in external diameter from the smaller end of said mandrel at a greater increasing rate than said mandrel.

6. A fishing rod having a tip end and increasing in diameter at an increasing rate from said tip end, and increasing in wall thickness from said tip end at a substantially uniform rate, the increase in diameter and wall thickness being such as to cause the zone of maximum curvature of and maximum stress on said rod to move away from said tip end as an increasing tension load laterally of said tip is applied to said rod.

7. A fishing rod having a tip end and a butt end, said rod increasing in diameter at an increasing rate from said tip end to a region intermediate said tip and butt ends, and also increasing in wall thickness from said tip end to said region, the rate of increase in diameter decreasing from said region to said butt end, whereby between said tip end and said region said rod has a concave profile, and whereby between said region and said butt end, said rod has a convex profile.

8. A fishing rod having a tip end and a butt end, said rod increasing in diameter at an increasing rate from said tip end to a region intermediate said tip and butt ends, and also increasing in wall thickness from said tip end to said region, the rate of increase in diameter decreasing from said region to said butt end, whereby between said tip end and said region said rod has a concave profile and whereby between said region and said butt end, said rod has a convex profile; the rate of increase in diameter and wall thickness between said tip end and said region being so proportioned as to cause a zone of maximum stress and curvature to travel away from said tip end as a tension load of increasing magnitude is applied to said tip end in a direction lateral of the normal axis of said rod.

9. As an article of manufacture, a fishing rod increasing in diameter from its tip end, said rod being tubular to define inner and outer wall surfaces, at least one of said wall surfaces having a concave profile and increasing in diameter at an increasing rate.

References Cited in the file of this patent

UNITED STATES PATENTS

| 2,571,717 | Howald et al. | Oct. 16, 1951 |
| 2,602,766 | Francis | July 8, 1952 |

FOREIGN PATENTS

| 67,261 | France | Sept. 2, 1957 |